US006299738B1

(12) United States Patent
Richardson, Jr.

(10) Patent No.: US 6,299,738 B1
(45) Date of Patent: Oct. 9, 2001

(54) FUEL GAS PRODUCTION BY UNDERWATER ARCING

(76) Inventor: William H. Richardson, Jr., 3035 Hickory Dr., Largo, FL (US) 33770

( * ) Notice: Subject to any disclaimer, the term of this patent is extended or adjusted under 35 U.S.C. 154(b) by 0 days.

(21) Appl. No.: 09/245,606

(22) Filed: Feb. 5, 1999

Related U.S. Application Data

(63) Continuation-in-part of application No. 07/854,938, filed on Mar. 20, 1992, now abandoned, which is a continuation-in-part of application No. 08/451,459, filed on May 26, 1995, now Pat. No. 6,153,058, which is a continuation-in-part of application No. 07/613,094, filed on Nov. 15, 1990, now abandoned.

(51) Int. Cl.[7] .......................................................... H05F 3/04
(52) U.S. Cl. ........................ 204/164; 204/170; 204/173; 204/168
(58) Field of Search ..................................... 204/164, 170, 204/173, 168, 242

(56) References Cited

U.S. PATENT DOCUMENTS

| 603,058 | * | 4/1898 | Eldridge et al. | ..................... 204/164 |
| 4,702,894 | * | 10/1987 | Cornish | ........................... 422/186.26 |

* cited by examiner

Primary Examiner—Arun S. Phasge
(74) Attorney, Agent, or Firm—Charles A. McClure

(57) ABSTRACT

Fuel gas production by underwater arcing bubbles up from the vicinity of the arc and is collected by an overlying hood and used or stored for use as a fuel, as in operation of a cutting or welding torch, or in operation of an internal-combustion engine. A reactor or production unit for such fuel gas contains a body of water, which may be open to the ambient atmosphere and be at ambient temperature. The arc is established in a spark gap between carbon electrodes and is facilitated by introduction of successive carbon rods end-on into the spark gap, as by dispensing them successively from a magazine.

12 Claims, 3 Drawing Sheets

FUEL GAS PRODUCTION BY UNDERWATER ARCING

This is a continuation-in-part of patent application Ser. No. 07/854,938, filed Mar. 20, 1992 now abandoned and Ser. No. 08/451,459 filed May 26, 1995 now U.S. Pat. No. 6,153,058, both of which were continuations-in-part of my previous application Ser. No. 07/613,094 filed Nov. 15, 1990 and subsequently abandoned.

TECHNICAL FIELD

This invention relates to production of gaseous fuel evolved as bubbles in underwater electrical arcing between carbon electrodes.

BACKGROUND OF THE INVENTION

Electrical arcing is known from U.S. patents to be conducive to hydrogen gas production, as via steam reforming at superatmospheric pressure and temperature, over a century ago by Eldridge et al. in U.S. Pat. No. 603,058 (1898). See also the contributions by other inventors cited in the examination of my U.S. Pat. Nos. 5,435,274 (1995); 5,692,459 (1997); 5,792,325 (1998); and 5,826,548 (1998). Most, if not all, of those inventors were interested mainly in collecting hydrogen, so other gases were absent, dissolved, reacted, or otherwise removed. Yet hydrogen is far from the ideal fuel it was often imagined to be.

SUMMARY OF THE INVENTION

A primary object of the present invention is to derive by underwater arcing a gaseous fuel easily and cleanly combustible with air.

Another object of this invention is to produce from underwater arcing a fuel gas rich in easily and cleanly combustible components.

A further object of the invention is to utilize such fuel gas, as in cutting or welding torches and in internal combustion engines.

Yet another object is an production of such a gaseous fuel in a simple production unit operable at ambient temperature and pressure.

A still further object is to achieve the aforementioned objects economically with such fuel—free of noxious combustion effluents.

In general the objects of the present invention are attained by making/using gases evolved as bubbles in underwater carbon arcing.

More particularly, the objects of this invention are attained by means of a plurality of underwater electrodes plus added carbon.

Other objects of the present invention, together with means and methods for attaining the various objects, will become apparent from the following description and the accompanying diagrams of preferred embodiments presented here by way of example rather than limitation.

DESCRIPTION OF THE INVENTION

Figure 1:
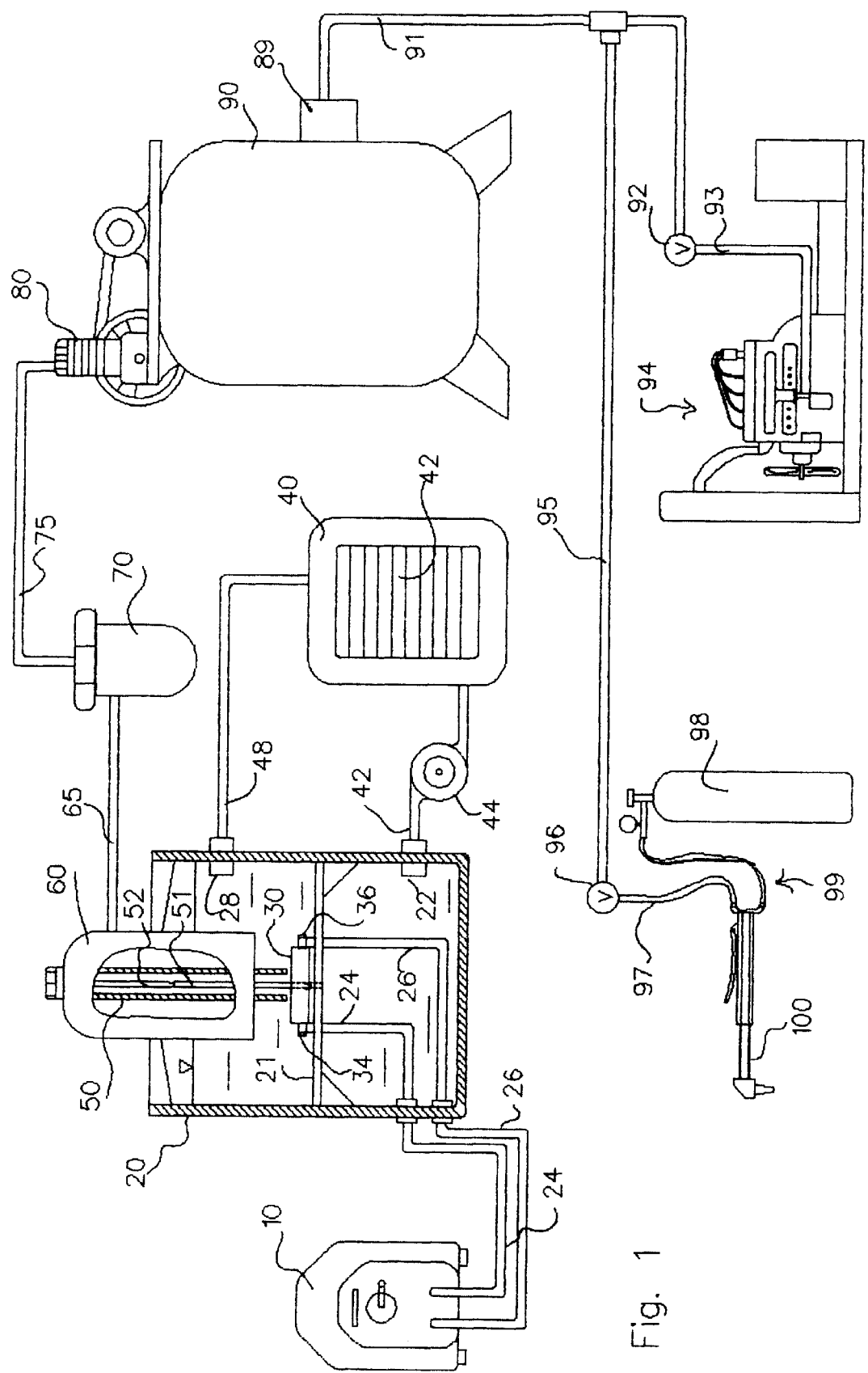
FIG. 1 is a schematized elevation of apparatus adapted to make, and apparatus to use, the fuel gas of this invention.

FIG. 1 shows in schematic elevation apparatus for evolving and collecting a mixture of gases as the fuel gas of this invention. At the left is welder 10 as an exemplified high-current power supply. Pair of electrical leads 24, 26 go to and through reactor wall 20 and connect at terminals 34, 36 across block electrode assembly 30 (detailed in FIG. 2) supported on horizontal partial partition 21.

Reactor 20, the gas-production unit, contains a body of water (dashes) to a high level (triangle) covering the electrode assembly. Also submerged is water outlet 22, near the bottom, to water line 42 containing filter/pump 44 and leading to heat exchanger 40 hidden by louvers 42 and on to inlet 48 (near top) at the end of return line 48 from the heat exchanger. Carbon rod magazine 50 and laterally surrounding gas collection hood 60 enter the reactor from the top and terminate under water, above block electrode assembly 30. First and second rods, 51 and 52, are aligned upright within the magazine, centered above the electrode assembly, with the bottom end of the first rod close to bridging the narrow edges of the respective electrodes (shown later) and with the top end of the first such rod touching the bottom end of the second such rod, to follow on as the first rod is consumed progressively at a prevailing temperature of several thousand degrees in the electrically conducting arc.

Gas takeoff line 65 connects the interior of hood 60 to filter 70, from which gas collection line 75 connects to compressor 80 on top of, and communicating with, storage tank 90. Tank outlet valve 89 has fuel supply line 91 connecting the tank through valve 92 to fuel line 93 of internal combustion engine assembly 94. Connecting further fuel supply line 95 connects through valve 96 to fuel line 97 of torch 100 to which line 99 connects from oxygen tank 98.

Figure 2:
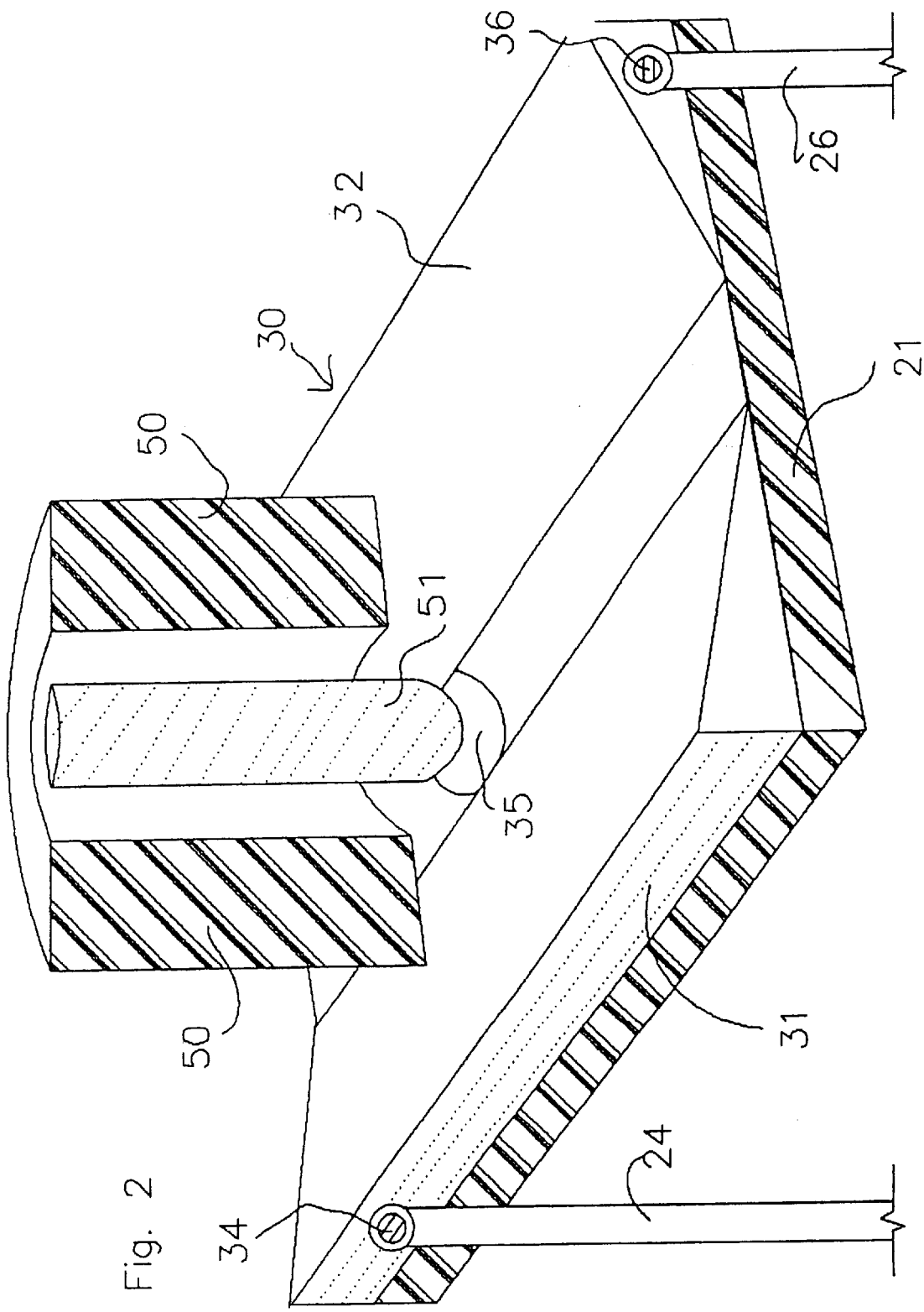
FIG. 2 is a fragmentary perspective view, on an enlarged scale, of a spark gap and vicinity, including components of the apparatus.

FIG. 2 shows fragmentarily, in perspective, electrode assembly 30 on reactor partition 21 (much as FIG. 1 but larger) defining a spark gap therebetween. Central opening 35 in the compartment is as wide as the spacing between the narrow edges of respective wedgeshaped electrodes 31, 32. The rounded lower end of rod 51 is nearing the opening, within which it will rest as the arc is struck across the electrodes and through it when power is applied across the electrodes at terminals 34, 36. Water illustration is omitted as unnecessary to an understanding of this view, but it should be understood that an arc between the electrodes via the rod heats the water so greatly as to break the water down into constituent gases (and perhaps further), thus producing gaseous hydrogen, also gases comprising hydrogen and carbon, or carbon and oxygen, or all three.

Figure 3:
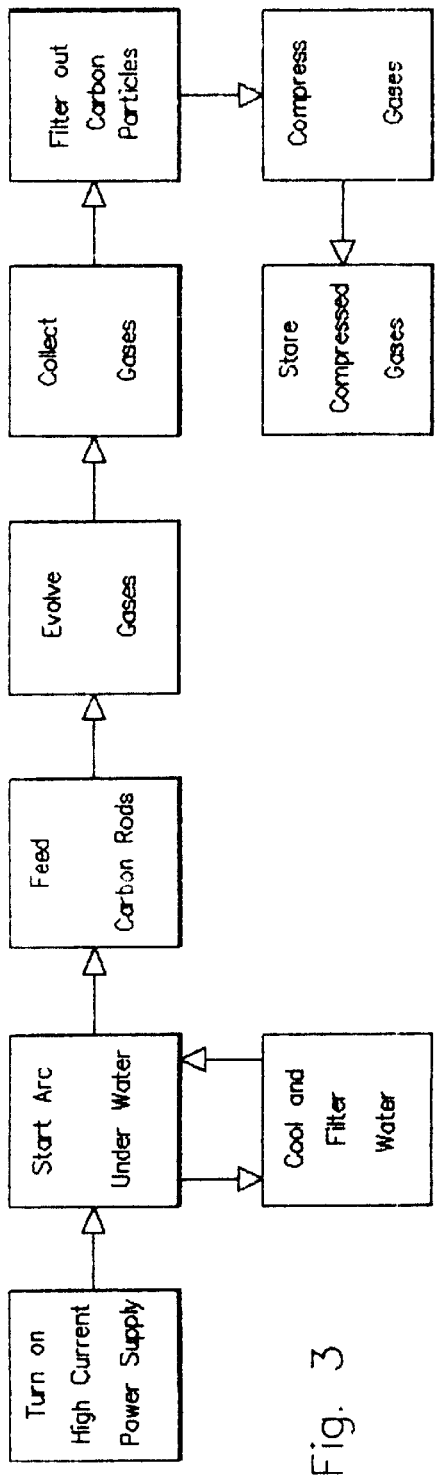
FIG. 3 is a schematic block diagram of the production procedure for obtaining the gaseous fuel mixture of this invention.

FIG. 3 shows, in block form, a flow diagram of steps that take place in the practice of this invention. Sequential steps include Turn On High Current Power Supply, Start Arc Under Water, Feed Carbon Rods, Evolve Gases, Collect Gases, Filter Carbon Particles, Compress Gases, and Store Compressed Gases. The last mentioned step is performed upon an evolved, partly reacted, mixture of constituent and by-product gases, useful as a fuel gas. Cool And Filter Water is a cyclical accessory step useful in maintaining water conditions as desired, especially at the locus of gas evolution—from which the evolved gases bubble up through the intervening water and into the overlying hood, to be drawn off and stored for use.

Figure 4:
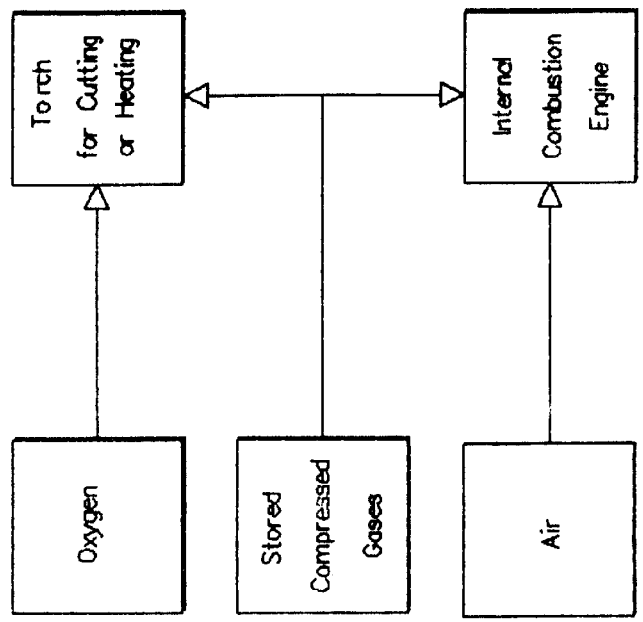
FIG. 4 is a schematic block diagram of using the same fuel gas in cutting/welding torches and/or in internal-combustion engines.

FIG. 4 shows, in similar block form, examples of subsequent usage of the gaseous mixture evolved and collected (as in FIG. 3). Stored Compressed Gases go as a fuel gas to a Torch for Cutting or Heating, also supplied with Oxygen, and/or to an Internal Combustion Engine, also supplied with Air. These exemplified uses may be augmented in kind or in number in accordance with demand and supply.

How to practice this invention is readily apparent from FIGS. 1 to 4 and the foregoing description. Underwater arcing occurs when an electrical potential (either A.C. or D.C.) such as used in steel welding is applied across the block electrodes, preferably composed essentially of graphite, and aided by a conductive rod (preferably similarly carbon) bridging the spark gap between the electrodes. The evolved gas(es) is(are) evidenced by bubbles forming in the vicinity and rising in the surrounding body of water, thus entering the hood.

The mixture of gases so evolved and collected according to the present invention contains (by volume) gaseous hydrogen in major amount, and carbon monoxide in substantial minor amount. Also likely to be present as end-products (here by-products) are carbon dioxide and gaseous oxygen—insufficient to render the mixture of gases to be self-combustible (rarely more than several percent). Traces of simple organic gases may be present, as may complex aggregations (as yet unidentified) of the constituent carbon, hydrogen and/or oxygen.

Carbon in the resultant gaseous mixture comes mainly from the rod used to bridge the block electrodes. Carbon dioxide content is limited by relative absence of hydrocarbons, oils, or other organic chemicals, such as otherwise might combine with the oxygen released by water decomposition in the reactor. Resulting gaseous oxygen may be attributed to the water decomposition and/or to having been dissolved in the water. Operation of an internal-combustion engine is substantially free of noxious effluents usually characteristic of fossil fuel combustion and will reduce any carbon deposits therein. An engine running on this fuel in a closed room lacks noxious fumes and related health hazards (except for eventual oxygen depletion).

Analysis of this fuel gas can be expected to verify about three to five tenths hydrogen, two to three tenths carbon monoxide, less than one tenth organics, maybe up to a couple tenths of aggregations derived from C, and/or H, and/or O—not yet adequately identified.

The resulting fuel gas burns well, upon access to air or oxygen in effective amount, with substantially clear flame and no sooting. As noted, with air or oxygen it can fuel a cutting or welding torch, and with air alone can operate an internal combustion engine without need for any atomizing carburetor or complex injection nozzle. Such an engine may be of jet, piston, turbine, or other type, useful in powering a vehicle, a pump, or an electrical generator, for example.

No unusual materials of construction are needed in apparatus of this invention. The reactor need be only a structurally sound tank, such as steel or other metal, and is preferably grounded. The hood to receive the evolved gases, and the magazine to hold and dispense carbon rods, are conveniently made of metal, plastic, or ceramic. The magazine may accommodate several to a dozen or more rods, being conveniently loaded substantially upright such as side-by-side on a surface descending to an exit directly above a desired electrode-bridging spark gap—so as to be easily loaded, then fed by gravity.

The rods themselves may be common welding rods, composed mainly or exclusively of particulate carbon pressed into continuous form. The electrode blocks are solid graphite, also generally available for high-temperature and/or high-pressure environments, although the operating environment of the present process is much less demanding. Chemical inertness and electrical conductivity are highly desirable, and the reactor or production unit may be operated open to ambient conditions or may be enclosed, similarly, and heated or pressurized An equidistantly spaced third electrode is preferred to enable three-phase A.C. operation of the reactor for maximum output. An electrical potential approximating a hundred volts is recommended.

The water to be decomposed in the process of this invention is not subject to any unusual requirement, whereupon most fresh water sources, or brackish or sea water, even wastewater can be expected to prove satisfactory. Selected water should not contain petroleum products or other organic—especially fossil—materials in more than token concentration, as they might contaminate the resulting fuel gas with a plethora of component compositions less clean-burning, or otherwise might result in a fuel gas that is less desirable overall. Biomass materials are usually a similarly undesirable feedstock, and preferably are removed by coagulation, flotation, filtration, etc.

The toxicity of carbon monoxide is tolerated in preference to conversion of carbon monoxide to carbon dioxide in the reactor—with reduction in fuel capability—because concentrated fuel materials of whatever sort pose health and safety hazards. Caution is essential in handling and using any fuel, so it is expected to be exercised in the instance of this fuel gas—which is much safer than gasoline.

As combustion products of hydrogen and/or carbon monoxide are predominantly simply water and carbon dioxide, clean burning is an understandable characteristic of the resulting fuel gas, as is the preference for exclusion of organic materials generally. Further advantages include the fact that water is a relatively low-cost feed material, as is carbon (if less so). Also, little electric power is required because only low impedance exists across the spark gap during conduction for decomposing/vaporizing both carbon and water.

The present invention is especially desirable in those regions devoid of fossil fuels, or that are subject to excessive pollution from long-time usage of low-grade and/or high-contaminant fuels, or where the inhabitants lack the purchasing capability to obtain fuel.

Preferred embodiments and variants have been suggested for this invention. Other modifications may be made, as by adding, combining, deleting, or subdividing compositions, parts, or steps, while retaining at least some of the advantages and benefits of the present invention—which itself is defined in the following claims.

The claimed invention:

1. Gaseous fuel manufacturing method, comprising operating an underwater carbon arc in a body of water in substantial absence of hydrocarbons, and evolving in the form of bubbles a gaseous mixture characterized by being non-self-combustible but being combustible as a fuel gas with added air, including opening a surface of the body of water to the surrounding atmosphere and thereby maintaining the water at substantially ambient pressure.

2. Gaseous fuel manufacturing method, comprising operating an underwater carbon arc in a body of water in substantial absence of hydrocarbons, and evolving in the form of bubbles a gaseous mixture characterized by being" non-self-combustible but being combustible as a fuel gas with added air, including maintaining the body of water at substantially ambient temperature.

3. Gaseous fuel manufacturing method, comprising operating an underwater carbon arc in a body of water in substantial absence of hydrocarbons, and evolving in the form of bubbles a gaseous mixture characterized by being non-self-combustible but being combustible as a fuel gas with added air, wherein electrical conduction occurs between a plurality of carbon electrodes spaced apart by a spark gap submerged in the body of water, and including inserting a rod of carbon end-on into the spark gap and maintaining its position there, as the end of the rod within the spark gap is consumed during the electrical conduction across the gap.

4. Method according to claim 3, including providing a succession of carbon rods end-to-end to undergo such consumption in the underwater spark gap.

5. Method according to claim 4, including collecting the evolving gaseous mixture as a succession of bubbles in an overhead hood with an open bottom end extending below the water surface.

6. Gaseous fuel manufacturing apparatus comprising a reactor vessel partly filled with a body of water, comprising a plurality of underwater block electrodes spaced apart to form a spark gap to receive an electrical potential thereacross;

an upright conductive carbon rod extending downward into the spark gap and thereby facilitating an electrical arc thereacross so as to convert carbon and water into such a gaseous fuel mixture.

7. Apparatus for converting carbon and water into a fuel gas, comprising a reactor vessel containing a body of water with a top surface;

a pair of underwater block electrodes therein spaced laterally apart and thereby defining a spark gap;

interposable conductive means an electrical terminal at each electrode, together adapted to apply an electrical potential difference thereacross sufficient to strike an underwater arc when conductive means is interposed.

8. Apparatus according to claim 7, wherein a surface of the body of water is open to the ambient atmosphere.

9. Apparatus according to claim 7, wherein the interposable conductive means comprises a carbon rod supported above and end-on downward into the arc.

10. Apparatus according to claim 9, including magazine means above the spark gap, laterally surrounding a plurality of conductive rods, and adapted to dispense the rods successively end-on downward, as such conductive means into the spark gap.

11. Apparatus according to claim 10, wherein hood means laterally surrounds the magazine means and and extends downward into the body of water and is thereby adapted to collect gases evolving as bubbles in the vicinity of the spark gap.

12. Apparatus according to claim 7, including hood means above the spark gap, extending down into the body of water and thereby adapted to collect bubbles of gas evolving therefrom.

* * * * *